United States Patent
Deng

[19]

[11] Patent Number: 5,826,294

[45] Date of Patent: Oct. 27, 1998

[54] COMPACT DEPRESSED PARK WIPER SYSTEM WITH CLUTCH LOCK MECHANISM

[75] Inventor: Xiaoming Deng, Ann Arbor, Mich.

[73] Assignee: Ford Motor Company, Dearborn, Mich.

[21] Appl. No.: 562,859

[22] Filed: Nov. 27, 1995

[51] Int. Cl.⁶ ............................... B60S 1/24; F16H 21/20
[52] U.S. Cl. ............................................ 15/250.16; 74/600
[58] Field of Search ......................... 15/250.16, 250.17, 15/250.13, 250.3, 250.19, 250.31; 74/600, 601, 602, 836, 837, 70, 570, 75

[56] References Cited

U.S. PATENT DOCUMENTS

| | | | |
|---|---|---|---|
| 4,264,997 | 5/1981 | Kolb et al. | 15/250.29 |
| 4,400,844 | 8/1983 | Hayakawa et al. | 15/250.16 |
| 4,454,626 | 6/1984 | Schmidt et al. | 15/250.16 |
| 4,559,845 | 12/1985 | Fallows | 15/250.16 |
| 4,686,733 | 8/1987 | Sahara | 15/250.16 |
| 4,794,818 | 1/1989 | Eustache et al. | 15/250.16 |
| 4,878,398 | 11/1989 | Heinrich | 15/250.16 |
| 4,924,726 | 5/1990 | Rogakos et al. | 15/250.16 |
| 4,947,507 | 8/1990 | Naiki | 15/250.16 |
| 5,093,952 | 3/1992 | Nakatsukasa et al. | 15/250.13 |
| 5,179,759 | 1/1993 | Epple et al. | 15/250.13 |
| 5,388,482 | 2/1995 | Jones et al. | 15/250.16 |
| 5,392,486 | 2/1995 | Hojnacki | 15/250.16 |

FOREIGN PATENT DOCUMENTS

| | | | |
|---|---|---|---|
| 0405535 | 6/1990 | European Pat. Off. | |
| 2706831 | 12/1994 | France . | |
| 2943966 | 5/1981 | Germany | 15/250.3 |
| 3121626 | 12/1982 | Germany | 15/250.16 |
| 1449 521 | 9/1976 | United Kingdom . | |
| 2029542 | 3/1980 | United Kingdom | 15/250.13 |
| 2 219 491 | 12/1989 | United Kingdom . | |
| 95/01893 | 1/1995 | WIPO . | |

*Primary Examiner*—Gary K. Graham
*Attorney, Agent, or Firm*—David B. Kelley

[57] ABSTRACT

A vehicle window wiper system has wipers 12 with a range of motion between an in-wipe position I and an out-wipe position O when the wiper system is in a run mode, and a variable park range for the wipers between the in-wipe position I and a depressed park position P when the system is in a park mode. The wiper system has a reversible motor 40 for rotating a shaft 42 in a first direction when in the run mode and through a first predetermined arc in a counter direction when in the park mode. A clutch mechanism 38 mechanically connected with the shaft 42 has a lock pin 64 which operates to prevent reverse rotation of the clutch mechanism 38 when in the run mode and to secure the clutch mechanism 38 in a predetermined position when in the park mode. The lock pin 64 also stabilizes the clutch mechanism 38 when the wiper system is transitioning from the park mode to the run mode.

7 Claims, 4 Drawing Sheets

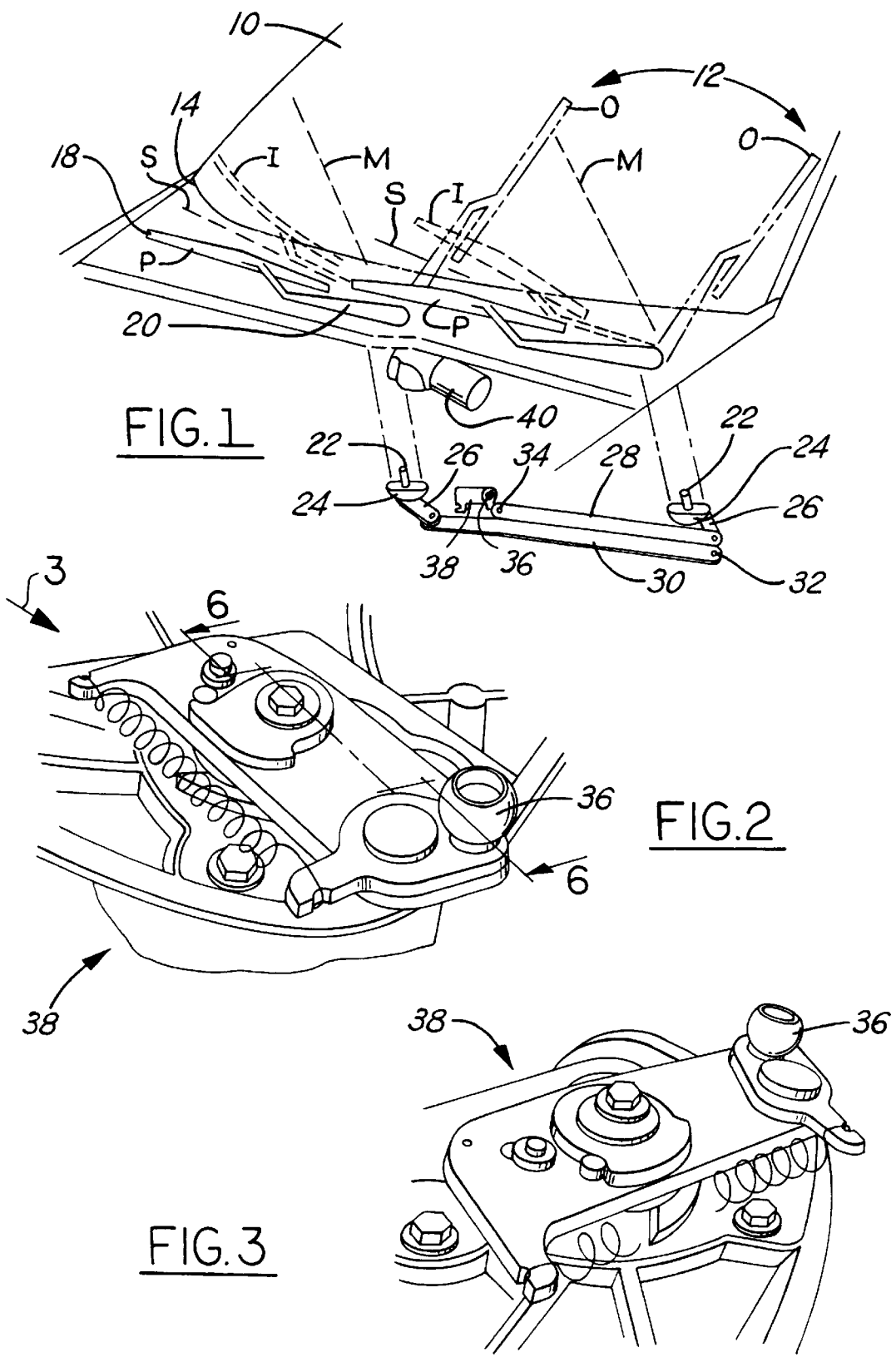

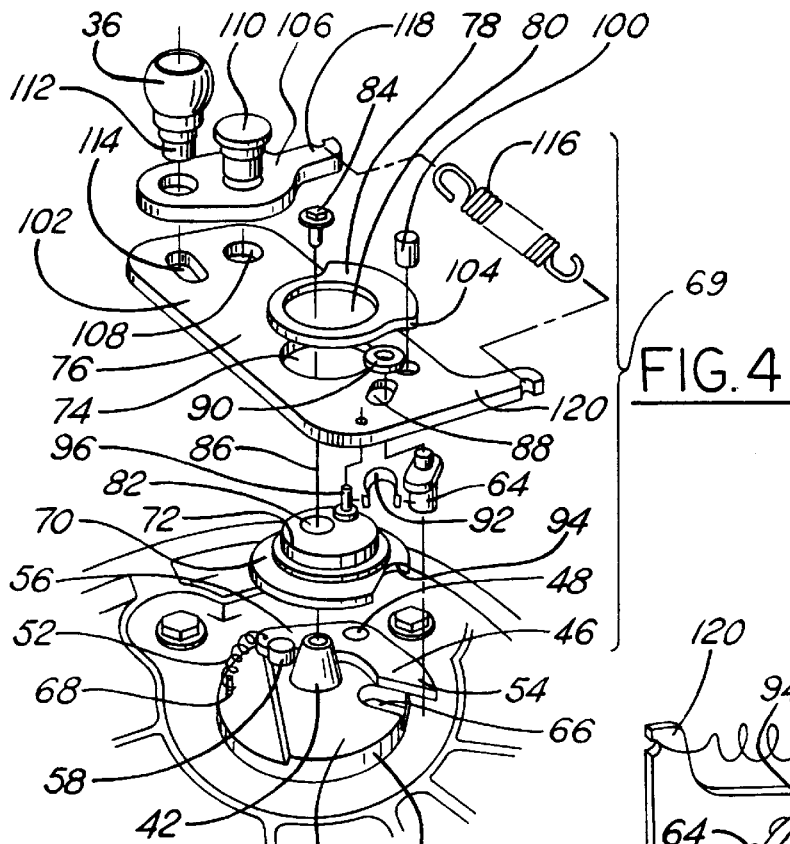
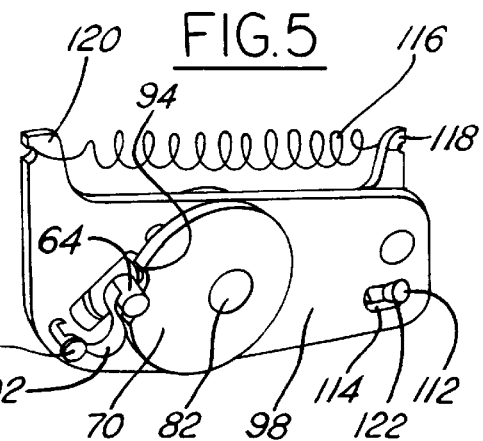
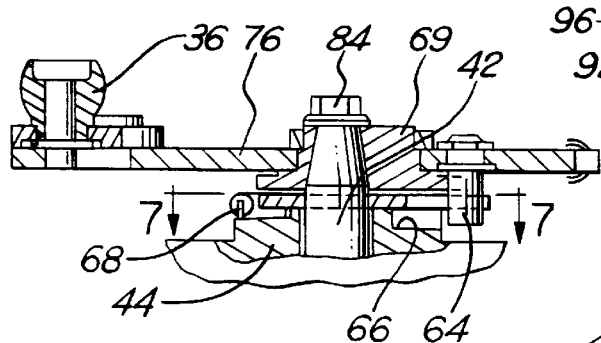
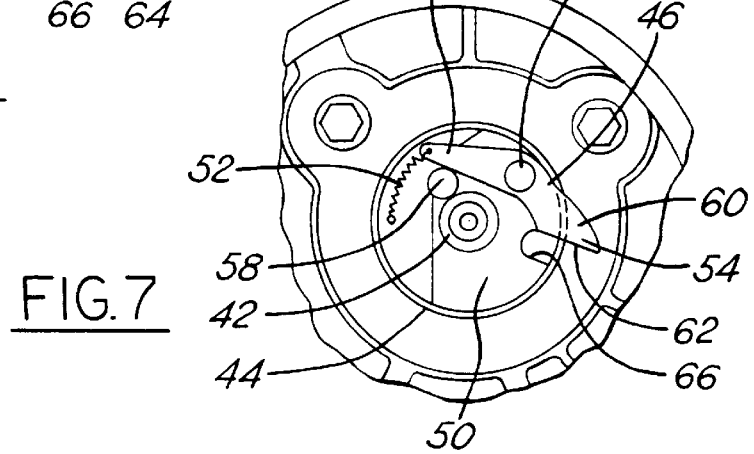

COMPACT DEPRESSED PARK WIPER SYSTEM WITH CLUTCH LOCK MECHANISM

FIELD OF THE INVENTION

The present invention relates to windshield wiper systems, and, more particularly, to depressed park windshield wiper systems.

BACKGROUND OF THE INVENTION

Automotive vehicle designers often desire a windshield wiping mechanism having a wiper which is positioned near or below the window cowl when not in operation, sometimes called a depressed park position. A wiper depressed park position is desirable for aesthetic purposes, as well as for preventing damage to the wipers when exposed to environmental conditions. Mechanisms for moving the wipers to the depressed park position typically do so by reversing motor direction forcing a drivepin, through which the motor drives the wipers, to a radially altered position to achieve a greater sweep radius.

When the wiping mechanism is in a wiping mode, the wiper blades can be subjected to strong forces, due to high winds resulting when the vehicle is traveling at high speeds. These forces may propagate to the clutch mechanism causing it to temporarily reverse direction which results in erratic wiping or wipe pattern degradation, both of which are undesirable from functional and aesthetic viewpoints. Further, damage to the wiper system, including the wiper blades, linkages, gears and motor, can occur when the system is started, particularly when in the depressed park position, due to system start-up inertial effects which can cause the wipers to strike the A-pillar, for example.

A depressed park mechanism having two separate locking structures is shown in U.S. Pat. No. 4,794,818 (Eustache et al.). One locking structure (V) locks rotation between a crank and an eccentric when rotating in one direction, but releases the eccentric from rotation with the crank in the opposite direction. The other locking structure (D) locks the crank relative to a support when a motor shaft rotates in a reverse direction, as well as at the start of rotation of the shaft in a normal direction. Use of two separate structures to accomplish the necessary locking functions increases component expense as well as assembly time. In addition, no provision is made in this device for preventing clutch mechanism reversal during wiping operation, that is, during operation in the normal direction.

There is therefore a need for an economical and compact depressed park windshield wiper system clutch mechanism with the capability of preventing clutch mechanism reversal during wiping operation, while also locking the clutch mechanism in the depressed park position and assisting the wiper system in evenly resuming wiping when in the parked position to avoid erratic wiper motion or damage to the system.

SUMMARY OF THE INVENTION

Responsive to the aforementioned needs in light of the related art, the present invention provides a vehicle window wiper system having a clutch mechanism with lock means for preventing reversal of the clutch mechanism during wiping operation. The lock means also accomplishes the functions of securing the clutch mechanism in a predetermined position when the wiping system is in a park mode, and assisting the clutch mechanism when transitioning from the park mode to the run mode so as to prevent erratic operation of the wipers. The windshield wiper system has a reversible motor for rotating a shaft to which the clutch means are attached for oscillating the wipers between and in-wipe position and in out-wipe position. A drivepin connected with the clutch means attaches to means for transforming the rotary motion of the drivepin to oscillatory motion of the wipers between the out-wipe position and the in-wipe position. The clutch means also operates to move the wipers to a depressed park position when the wiper system is turned off. In a preferred embodiment, the clutch means permits the wipers to move to an intermediate position between the in-wipe position and the depressed park position when the wipers are prevented from moving from the depressed park position, for example due to ice or snow build-up. In addition, the clutch means preferably has wipe range varying means for varying the oscillatory wipe range of the wipers between the in-wipe position and the out-wipe position in response to an obstruction therebetween, again for example ice or snow build-up.

In a preferred embodiment, the clutch mechanism has a crank plate eccentrically mounted on the shaft for rotation therewith, and a base plate mounted around the shaft in substantially parallel alignment with the crank plate. The base plate has a stop pin for engagement with the crank plate when the wiper system is in the run mode, so that the base plate rotates in a first direction. Also, connected to the base plate is a lock pin mounted on the lower side for slidable movement with respect thereto, the lock pin engaging a notch on the crank plate to prevent the clutch mechanism from reversing direction when in the run mode by locking the crank plate to the base plate. The lock pin also engages a lock groove in a shaft base to lock the clutch mechanism with respect to the shaft base when the wipers are in the depressed park position. The lock pin also maintains the base plate in a predetermined position as the crank plate is rotating with respect thereto when the wiper system is transitioning from the park mode to the run mode. Maintaining the base plate in a predetermined position prevents erratic wiper movement and the potential concomitant wiper damage associated therewith. The base plate is stop at a predetermined position when the wiper system is in the park mode by stop means comprising the pivotal latch are mounted on the shaft base. A clutch plate is pivotally mounted at a pivot point on the base plate and has a tension spring biasing it in a first relation with the base plate. The drivepin is mounted on the clutch plate with a drive ball attached thereto. The clutch plate overcomes the bias force of the tension spring to pivot about the pivot point when the drive ball is prevented from moving away from the shaft due to an obstacle between the in-wipe position and the depressed park position so as to allow the crank plate to rotate through a predetermined art. A slot in the base plate receives the drivepin therein to allow radially slidable movement of the drivepin relative to the shaft when the wiper system is in the run mode so as to enable reduction of the radius of rotation of the drivepin around the shaft in response to transmission of an obstruction induced force thereto so as to vary the wiping range of the wipers between the in-wipe position and the out-wipe position when the wipers system is in the run mode. When the wiping system is in the park mode, the crank plate and the base plate rotate together in a counter direction until reaching the predetermined position so that the stop means engages the lock pin to prevent the base plate from rotating therebeyond in the counter direction. The crank plate eccentrically rotates separately from the base plate through a predetermined ark in the counter-direction thereby moving the base plate, and the drive ball connected thereto, a predetermined distance away from the shaft to radially increase the distance of the drive ball from the shaft so as to position the wipers in the depressed park position.

To accomplish its purpose, the lock pin preferably has three positions. In a first position a lock pin is engaged in a notch in a crank plate to couple the base plate thereto so as to prevent reverse rotation of the mechanism when in the run mode. The lock pin is bias to the first position, for example with a medal leaf spring. In a second position, the lock pin is disengaged from the notch in the crank plate when the base plate is in the predetermined position so that the crank plate rotates with respect to the base plate when the wipers are moving to the depressed park position in the park mode. In the third position, the lock pin is engaged in a lock groove on a shaft base when the clutch mechanism moves the wipers to the depressed park position. The lock pin thus locks the clutch mechanism relative to the shaft base.

Thus, an advantage of the present invention is a windshield wiping system which provides a clutch mechanism with lock means to prevent reversal of the clutch mechanism during windshield wiping operation.

Another advantage of the present invention is a clutch mechanism having a single locking device for preventing reverse rotation of the clutch mechanism (luring wiping operation, for securing the clutch mechanism in a predetermined position when the wipers are moved to a depressed park position, and for maintaining stability of the clutch mechanism when transitioning from the run mode to the park mode.

Another advantage of the present invention is a clutch mechanism which can be retrofitted on to existing windshield wiping systems to provide additional functionality, including prevention of clutch mechanism reversal during the run mode.

Still another advantage is a wiper clutch mechanism which protects the wiper system from damage and erratic operation when the wipers are exposed to high winds.

Another advantage is windshield wiping system which is inexpensive to manufacture and easy to assemble.

Yet still another advantage of the present invention is a wiper clutch mechanism which in compact.

A feature of the present invention is a multi-function lock pin which engages a notch in a crank plate on the clutch mechanism during the run mode, and which engages a groove in a swiper system shaft base in the park mode and when transitioning from the park mode to the run mode.

BRIEF DESCRIPTION OF THE DRAWINGS

These and other objects, advantages and features of the present invention will be apparent to those skilled in the windshield wiping arts upon reading the following description with reference to the accompanying drawings, in which:

FIG. 1 is a perspective view of an automotive vehicle windshield showing the windshield wipers in various positions during a run mode and a park mode;

FIG. 2 is a perspective view of windshield wiper clutch mechanism according to an preferred embodiment of the present invention;

FIG. 3 is a perspective view of the clutch mechanism in the direction of arrow 3 in FIG. 2;

FIG. 4 is an exploded perspective view of the mechanism of FIG. 2;

FIG. 5 is a bottom perspective view of the clutch mechanism of FIG. 2;

FIG. 6 is a cross-sectional view taken along line 6—6 of FIG. 2;

FIG. 7 is a view taken along line 7—7 of FIG. 6;

DETAILED DESCRIPTION OF THE PREFERRED EMBODIMENT

Figure 8:
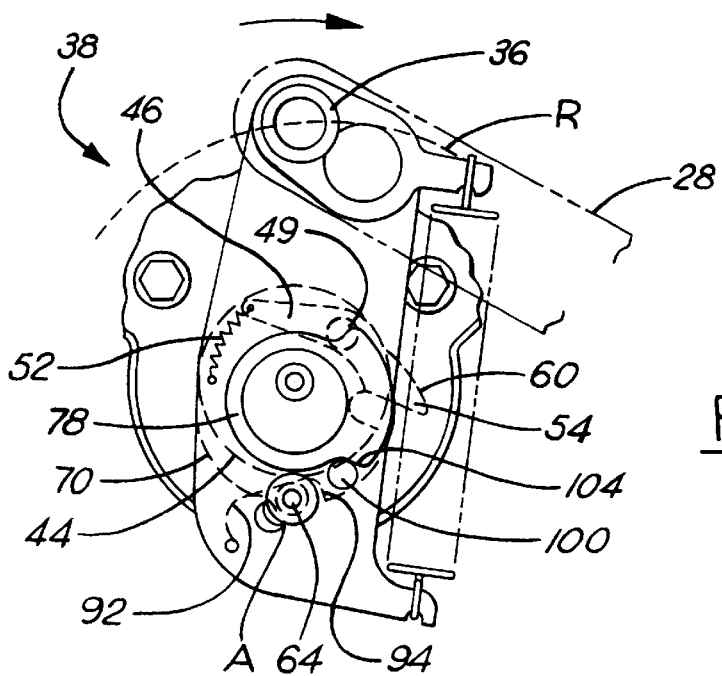
FIG. 8 is a top view of the clutch mechanism of the present invention shown in the run mode with a lock pin engaging a clutch plate.

Referring now to the drawings and in particular to FIG. 1 thereof, an automotive windshield 10 has a pair of wipers 12 attached below a cowl portion 14. Wipers 12 are movable between an in-wipe position I and an out-wipe position O during window 10 wiping operation. During such operation, it is possible that snow, ice, or other debris may collect in the normal wiping range between the in-wipe position I and the out-wipe position O, thereby forming an obstruction to normal wiping operation. In such a circumstance, the wipers 12 move between an intermediate position M and either the in-wipe position I or the out-wipe position O, depending upon the location of the obstruction. As further discussed below, the clutch mechanism of the present invention provides a variable wiping range between the in-wipe position I and the out-wipe position O without damaging the linkages, motor, or other windshield 10 system accessories, delineated in more detail below.

When not in operation, the wipers 12 are moved to a depressed park position P below the cowl 14. Such a position improves vehicle appearance and styling while providing protection for the wipers 12 from excessive wear due to the elements, such as wind, rain, and ice. When an obstacle prevents the wipers 12 from moving to the depressed park position P, for example, due to snow, ice, or some other debris in the cowl 14 area, the clutch mechanism of the present invention positions the wipers 12 at a variable depressed park position S between the in-wipe position I and the out-wipe position O (FIG. 1).

Still referring to FIG. 1, each wiper 12 has a wiper blade 18 and a wiper arm 20. The wiper arm 20 is fitted to one end of a wiper shaft 22 and a shaft mount 24. The other end of the shaft 22 is pivotally fitted to a drive link 26 which is pivotally connected to either the drive arm 28 or the slave arm 30. The slave arm 30 transmits the oscillatory motion of the drive arm 28 through the link 32 to that drive link 26 not connected to the drive arm 28. The drive arm 28 is pivotally journaled on one end 34 (FIG. 1) to a drive ball 36 (FIGS. 2–3) which is attached to a clutch mechanism 38 rotated by a motor 40 through a shaft 42 (FIG. 6).

Figure 9:
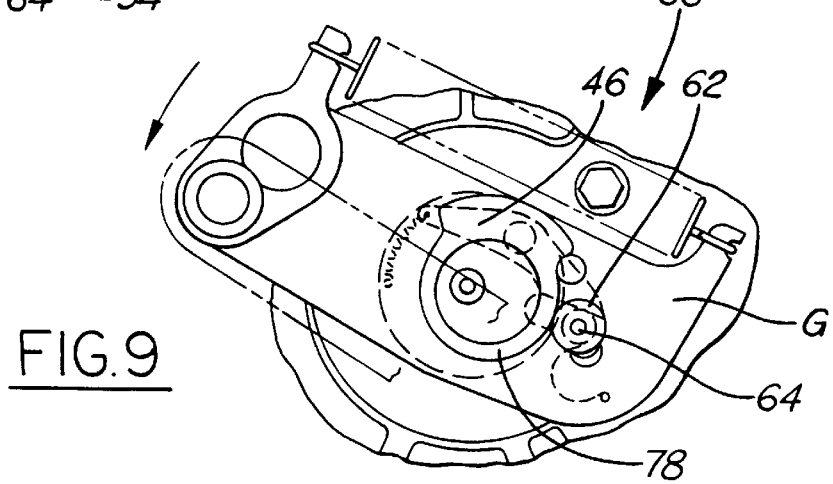
FIG. 9 is a view similar to FIG. 8 but showing the clutch mechanism after rotating in a counter-direction when in the park mode to a predetermined position in which the lock pin engages a latch arm to stop a base plate.

The motor 40 is a dual direction motor which can rotate the shaft 42 in either a clockwise or counterclockwise direction (FIGS. 8, 9). Motor 40 typically rotates the shaft 42 in one direction during wiping operations so that the wipers 12 move between the in-wipe position I and the out-wipe position O. When the wiping system is turned off by the vehicle operator, the construction of motor 40 is such that it automatically reverses direction and rotates the shaft 42 through a predetermined arc to a predetermined position. As further explained below, reverse rotation of the shaft 42 and the clutch mechanism 38 attached thereto results in the wipers 12 achieving the depressed park position P or, alternatively, the variable park position S.

In FIG. 4, the construction of a preferred embodiment of a clutch mechanism according to the present invention is shown in exploded view. Beginning near the bottom of FIG. 4, a cylindrically shaped clutch base 44 is shown having the shaft 42 projecting therefrom. A latch arm 46 is pivotally attached at pivot point 48 to top surface 50 of the clutch base 44. A tension spring 52 biases the latch arm 46 so that end 54 extends radially outward of the outer circumference of the clutch base 44. Opposite end 56 of latch arm 46 abuts latch pin 58 on the surface 50 of the clutch base 44. As best seen in figure 7, the end 54 of the latch arm 46 has a cammed side 60 and a flat side 62 which interact with a lock pin 64 (FIG. 4–6) as described below. The clutch base 44 has a lock groove 66 therein for interaction with the lock pin 64, also described below. The spring 52 is mounted on one end to end 56 of the latch arm, and on the other end to a spring pin 68 of the clutch 44 (FIG. 4). The stop pin 64 interacts with the end 54 of the latch arm 46 to halt rotation of a portion of the clutch mechanism 38 when the motor 40 direction is reversed, as is further described below. The lock pin 64 interacts with the lock groove 66 to likewise halt rotation of a portion of the clutch mechanism 38 when the motor 40 direction is reversed as is also described below.

Still referring to FIG. 4, a crank plate 69 is comprised of a bottom half 70 with a hub 72 which fits through a bore 74 in a base plate 76. A top half 78 of the crank plate fits over the hub 72 of the bottom half 70 and is attached thereto, for example through peening. The crank plate, for purposes of this specification, refers to the combined bottom half 70 and top half 78. Those skilled in the art will recognize that other crank plate constructions may be used, it being understood that the crank plate can rotate independently of the base plate 76. The hub 72 also fits within a bore 80 in the top half 78 of the crank plate 69. The combined base plate 76 and crank plate 69 is mounted to the shaft 42 through a bore 82 through the hub 72 of the lower half 70 of the crank plate 69 (FIG. 4–6). The shaft 42 preferably has a splined, frustoconically shaped head to reduce friction and slipping with the crank plate bore 82. In addition, the shaft is bored and threaded and so to receive a screw 84 through the bore 82 along the axis 86. With the arrangement just described, the crank plate 69 rotates with the shaft 42, and the base plate 76 can rotate independently of the crank plate 69.

The lock pin 64 is attached in a slot 88 in the base plate 76 with a connector 90. A central longitudinal axis of the slot extends non-orthogonally to the axis 86. As better seen in FIG. 5, the lock pin 64 is biased, for example by a metal leaf spring 92, to a position engaged to a notch 94 on the circumference of the lower half 70 of the crank plate 69. As further described below, the lower half 70 of the crank plate 69 will operate under some circumstances in conjunction with the latch arm 46 to slide the lock pin in the slot 88 against the bias force of the spring 92 so that it is forced to slide within the slot 88. A pin 96 attaches on an underside 98 of the base plate 76 for attachment of one end of the spring 92 thereto, the other end of the spring 92 being attached to the lock pin 64.

A stop pin 100 projects from an upper surface 102 of the base plate 76 for engagement with a cammed surface 104 of the upper half 78 of the crank plate 69 (FIG. 4). When the cammed surface 104 engages the stop pin 100, the base plate 76 moves around the axis 86 along with the crank plate 69. That is, the base plate 76 and the crank plate 69 will rotate as one.

Referring still to FIG. 4, the base plate 76 has pivotally mounted thereon a clutch plate 106 at a pivot point 108 with a clutch pin 110. On the clutch plate 106 is attached a drivepin 112 which extends through the clutch plate 106 and into a slot 114 in the base plate 76. Attached to the drivepin 112 is the drive ball 36, which as previously discussed, has a drive arm 28 journaled thereto. A tension spring 116 is connected at one end to end 118 of the clutch plate 106, and at the other end to arm 120 of the base which biases the clutch plate 106 to a position in which the drivepin 112 is at an end 122 of the slot 114 (FIG. 5). As described below, when a force is transmitted through the drive ball 36 sufficient to overcome the biasing force of the spring 116, the drivepin slides within the slot 114 which effectively reduces the sweep radius of the wipers.

Operation of the clutch mechanism of the present invention is best understood with reference to FIGS. 8–13. Beginning with FIG. 8, it is seen that the clutch mechanism 38 is rotated in a clockwise fashion around the motor shaft 42 so as to carry the ball 36 through a radius R. The rotary motion of the ball 36 is translated through the drivearm 28, the slavearm 30, and the drive links 26 to produce oscillatory motion of the wipers 12 between the in-wipe position I and the out-wipe position O (FIG. 1). This translation of rotary motion into oscillatory motion is shown schematically in FIG. 13. When the motor 40 turns the clutch mechanism 38 in this fashion, the wiper system is said to be operating in the "run mode".

During rotation of the clutch mechanism 38, as shown in FIG. 8, cammed surface 104 of the upper half 78 of the crank plate 69 abuts the stop pin 100 to simultaneously rotate the base plate 76, and the drive ball 36 connected thereto. As the base plate 76 rotates, the lock pin 64 carried therewith in position A rotates around the shaft base 44 in a clockwise direction. The lock pin 64 rotates over the cammed surface 60 of the latch arm 46 thus causing it to pivot around the pivot point 48 and overcoming the bias force of the spring 52 to cause the end 54 to move radially inwardly toward the shaft 42. The lock pin 64 is thus able to freely rotate in a clockwise fashion around the shaft base 44. As the clutch mechanism rotates clockwise, the lock pin 64 is biased toward the notch 94 in the lower half 70 of the crank plate 69 (FIGS. 5 and 8).

Reverse rotation of the clutch mechanism 38, may occur without implementation of the present invention when a force is directed through the drive ball 36 to cause the base plate 76 to rotate in a counterclockwise fashion. Such a force may arise when the wipers 12 are subjected to high winds, for example, when the vehicle is traveling at high speeds during wind storms, or when subjected to high pressure sprays in a carwash environment. Should this force be in a direction opposite to the momentary wiping direction, a resistive force is translated through the wipers 12 to the drivearm 28 and to the drive ball 36. Without the lock pin 64 of the present invention engaging the notch 94 on the lower half 70 of the crank plate 69, the base plate 76 would rotate in the counterclockwise direction. However, the lock pin 64 and the stop pin 100 operate to insure that the crank plate 69 and the base plate 76 rotate as one unit when the system is in the run mode notwithstanding a counteractive resistive force as discussed. The wipers 12 will thus operate in a smooth pattern across the windshield 10 without the erratic motion experienced in absence of a clutch lock mechanism as described.

Figure 10:
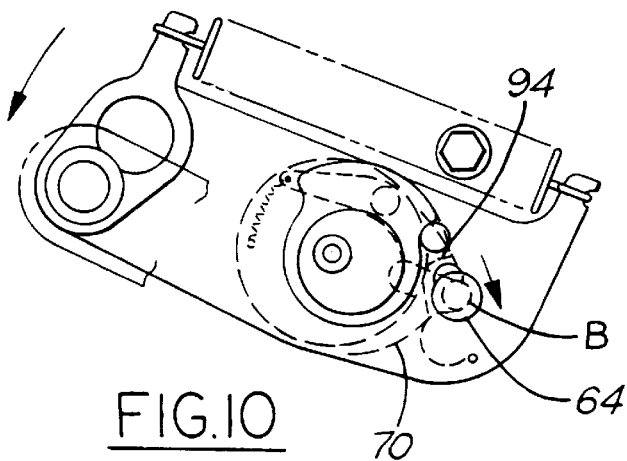
FIG. 10 is a view similar to FIG. 9 but showing a lock pin disengaging from a notch in a crank plate of the clutch mechanism.

When wiping operation ceases, that is when a vehicle operator turns off the wiping system mechanism, the "park mode" of the system moves the wipers 12 to the depressed park position P. To achieve that position, the motor 40 reverses direction and rotates the shaft 42, and the clutch mechanism 38 mounted thereto, in a counterclockwise direction to a predetermined position G, as shown in FIGS. 9–10. As seen in FIG. 9, the lock pin 64 engages the flat surface 62 of end 54 of the latch arm 46 which is prevented from pivoting about pivot point 48 by end 56 abutting latch stop 58 (FIG. 7). As the crank plate 69 continues to rotate in a counterclockwise direction, the lock pin 64 is forced out of the notch 94 by interaction with the latch arm 46 to a position B (FIG. 10 and 10A) against the force of spring 92. When the lock pin 64 is in the position B, the crank plate 69 can rotate independently of the base plate 76, which is stationary with respect to the shaft base 44.

Figures 11, 11A:
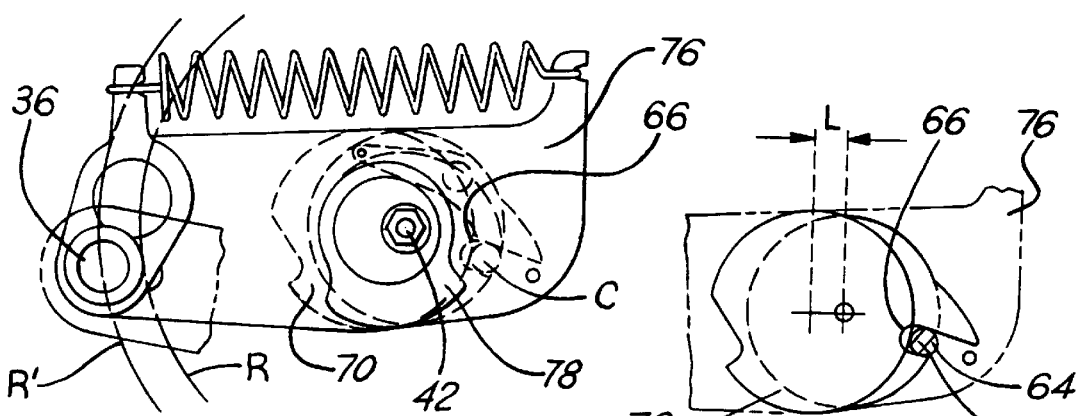
FIG. 11 is a view similar to FIG. 10 but showing an eccentrically mounted crank plate rotating on a shaft with respect to a stationary base plate so as to increase the radial distance of a drive ball with respect to the shaft while the lock pin concurrently engages a lock groove in the shaft base.
FIG. 11A is a view similar to FIG. 10A but showing the lock pin engaged with a lock groove on the shaft base when the clutch mechanism moves to the depressed park with respect thereto.
Figure 12:
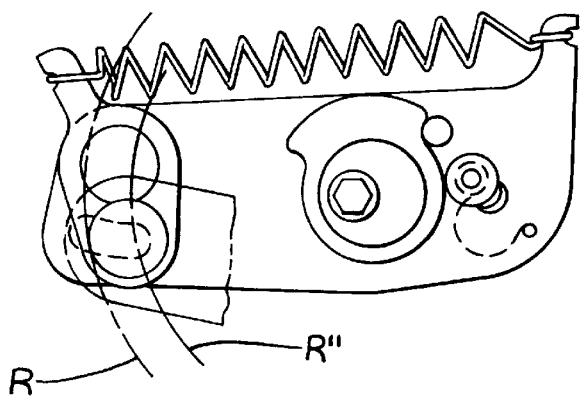
FIG. 12 is a view similar to FIG. 8 but showing the clutch mechanism in a position allowing a variable wiping range in response to a force on the clutch drive ball.
Figure 13:
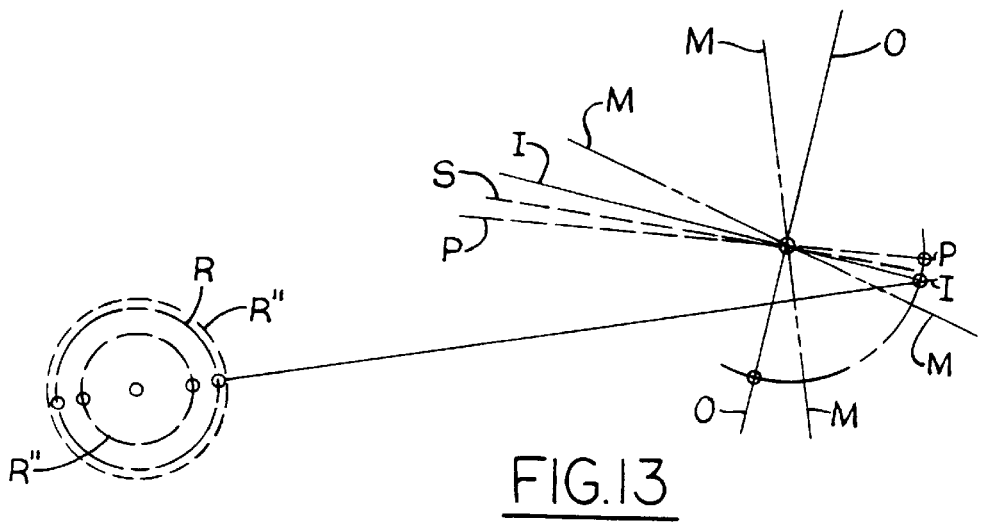
FIG. 13 is a simplified schematic representation of the operation of the clutch mechanism of the present invention showing the run position, the variable run position and depressed park position.

As seen in FIG. 11, the crank plate 69 rotates approximately 180° with the shaft 42 while the base plate 76 remains rotationally stationary. However, since the crank plate 69 is eccentrically mounted on the shaft 42 with the hub 72 within the bore 74 and the base plate 76, the base plate 76 translates a distance L (FIG. 11A) with respect to the shaft 42 so that the drive ball 36 achieves an increased radius of rotation R'. This increased radius of rotation R' results in an increased sweep radius for the wipers 12 collectively causing them to move to the depressed park position P (FIGS. 11 and 13).

As the base plate 76 translates the distance L, the lock pin 64, which is attached thereto, is positioned so as to engage the lock groove 66 in the shaft base 44. In this position C, the lock pin 64 prevents the clutch mechanism 38 from rotating in either direction (FIG. 11A).

Figure 10A:
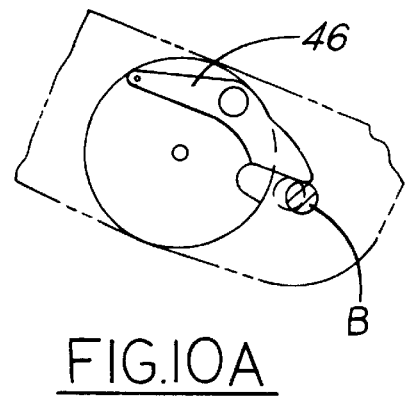
FIG. 10A is a top view of a wiper system shaft base according to the present invention showing the lock pin engaged by the latch arm when the clutch mechanism is in the position shown in FIG. 10.

When the wiper system is again turned on, the motor 40 rotates the shaft 42 in a clockwise direction and the crank plate 69 will rotate from the position shown in FIG. 11 to the position shown in FIG. 10. During this transitioning from the park mode to the run mode, the lock pin 64 moves from position C (FIG. 11A) to position B (FIG. 10A). The wipers 12 thus move from the depressed park position P to the in-wipe position I (FIG. 13). It is important during this transition that the base plate 76 remain fixed to the shaft base 44 to prevent erratic movement of the wipers 12 due to inertial effects. Such inertial effects are potentially caused when, at system start up, the wipers are essentially "flung" across the windshield 10. This can typically occur when the windshield is wet and there is little surface friction from the windshield to inhibit the inertia of the wipers, the linkages, and the clutch mechanism 38, all of which are being driven toward the out-wipe position O by the motor 40. The lock pin 64 remains within the locked groove 66 during this transition to prevent such undesirable wiper 12 movement.

When the crank plate 69 has rotated to the position shown in FIGS. 9 and 10, the lock pin 64 is urged under the force of spring 92 to the position A in engagement with the notch 94 to once again lock the base plate 76 to the clutch plate 69 (FIG. 9). Further clockwise rotation of the shaft 42 will rotate the clutch mechanism 38 to produce the oscillatory wipe motion between the in-wipe position I and the out-wipe position O as previously described.

When in the run mode, that is, when the shaft 42 turns the clutch mechanism 38 in a clockwise direction as in FIG. 8, ice, snow, or other debris may result in the wipers 12 being obstructed from moving between in-wipe position I and the out-wipe position O. An obstruction induced force is transmitted through the wiper linkages through the drive ball 36, which then slides the drivepin 112 within the slot 114 in the base plate 76 radially relative to the shaft 42. Simultaneously, the clutch plate 106 pivots on the pivot point 108 and moves relative to the base plate 76 while resisting the tension force of the spring 116 mounted therebetween. The radially slideable movement of the drivepin 112 in the slot 114 produces rotation of the drive ball 36 around the shaft 42 to a radius R" (FIG. 12) so as to vary the range of motion of the wipers 12 to an intermediate position M between the in-wipe position I and the out-wipe position O (FIG. 13).

Although the preferred embodiments of the present invention have been disclosed, various changes and modifications may be made without departing from the scope of the invention as set forth in the appended claims.

I claim:

1. A vehicle window wiper system having a run mode in which a vehicle window is wiped and a park mode, the wiper system comprising:

(1) a dual direction motor having a shaft rotatable thereby about a shaft axis;

(2) a drivepin in mechanical connection with the shaft for rotary motion therearound;

(3) means for transforming the rotary motion of the drivepin to oscillatory motion of at least one window wiper; and (4) a clutch mechanism having a crank plate eccentrically mounted on the shaft for rotation in a forward and a reverse direction, and a base plate mounted around the shaft with the drivepin connected thereto for rotation with the crank plate in a run direction, the base plate separable from the crank plate when the motor direction is reversed, the clutch mechanism further comprising:

(a) depressed park means for moving the at least one wiper to a depressed park position when the wiper system is turned off upon reversal of the motor; and (b) a clutch reversal prevention mechanism for preventing reverse rotation of the clutch mechanism when the wiper system is operating in the run mode, the clutch reversal prevention mechanism comprising:

an elongated lock pin slot in said base plate having a central axis of elongation lying in a plane perpendicular to said shaft axis and extending non-orthogonally to said shaft axis;

a lock pin mounted in said slot on a lower side of the base plate for slidable movement with respect thereto;

a notch in the crank plate for receiving the lock pin in engagement therewith when the system is in the run mode to prevent the clutch mechanism from reversing direction by retaining the crank plate to the base plate.

2. A wiper system according to claim 1 wherein the lock pin is movable between:

a first position engaged in the notch in the crank plate to couple the base plate thereto to prevent reverse rotation of the clutch mechanism when in the run mode;

a second position disengaged from the notch when the base plate is in a predetermined position so that the crank plate rotates with respect thereto to move the at least one wiper to the depressed park position; and a third position engaged in a lock groove on a clutch base when the depressed park means moves the at least one wiper to the depressed park position so as to lock the clutch mechanism relative to the clutch base.

3. A wiper system according to claim 1 wherein the crank plate eccentrically rotates separately from the base plate in a counter direction through a predetermined arc when the motor reverses direction to radially increase the distance of the drivepin from the shaft thereby positioning the at least one wiper in the depressed park position.

4. A wiper system according to claim 1 wherein the clutch mechanism has wipe pattern varying means comprising slot means in the clutch mechanism for receiving the drivepin therein to allow radially slidable movement relative to the shaft to enable reduction of the radius of rotation of the drivepin around the shaft in response to transmission of an obstruction induced force to the drivepin.

5. A vehicle window wiper system having a run mode and a park mode, the wiper system comprising:

(1) at least one window wiper having a range of motion between an in-wipe position and an out-wipe position when the wiper system is in the run mode, and having a variable park range between the in-wipe position and a depressed park position when the system is in the park mode;

(2) a motor for rotating a shaft in a first direction when in the run mode and through a predetermined arc in a counter direction when in the park mode;

(3) a clutch mechanism mechanically connected with the shaft for rotary motion therearound, the clutch mechanism comprising:

(a) a crank plate eccentrically mounted on the shaft for rotation therewith;

(b) a base plate mounted around the shaft in substantially parallel alignment with the crank plate, the base plate having:

(i) a stop pin for engagement with the crank plate when the wiper system is in the run mode so that the base plate rotates in the first direction; and (ii) a lock pin mounted thereon for slidable movement with respect thereto, the lock pin:

engaging a notch on the crank plate to prevent the clutch mechanism from reversing direction when in the run mode by locking the crank plate to the base plate;

engaging a lock groove in a clutch base to lock the clutch mechanism with respect thereto when the at least one wiper is in the depressed park position; and maintaining the base plate in a predetermined position as the crank plate is rotating with respect to the base plate when the wiper system is transitioning from the park mode to the run mode;

(c) stop means for stopping the base plate at a predetermined position when the wiper system is in the park mode;

(d) a clutch plate pivotally mounted at a pivot point on the base plate and having a tension spring biasing the base plate thereto in a first relation;

(e) a drivepin mounted on the clutch plate having a drive ball attached thereto;

(f) a slot in the base plate for receiving the drivepin therein to allow radially slidable movement of the drivepin relative to the shaft when the wiper system is in the run mode to enable reduction of the radius of rotation of the drivepin around the shaft in response to transmission of an obstruction induced force thereto so as to vary the range of motion of the at least one wiper between the in-wipe position and the out-wipe position when the wiper system is in the run mode;

(g) the crank plate and the base plate rotating together in the counter-direction when in the park mode until reaching the predetermined position so that the stop means engages the lock pin to prevent the base plate from rotating therebeyond in the counter-direction, the crank plate eccentrically rotating through the predetermined arc in the counter direction to move the base plate, and the drive ball connected thereto, a predetermined distance away from the shaft to radially increase the distance of the drive ball from the shaft thereby positioning the at least one wiper in the depressed park position;

(h) the clutch plate overcoming the bias force of the tension spring to pivot about the pivot point when the drive ball is prevented moving away from the shaft due to an obstacle between the in-wipe position and the depressed park position so as to allow the crank plate to rotate through the predetermined arc;

(4) a driver arm journaled to the drive ball; and (5) means for transforming the motion of the driver arm to oscillatory motion of the least one window wiper between the in-wipe position and the out-wipe position.

6. A wiper system according to claim 5 wherein the stop means comprises a pivotal latch arm mounted on the shaft base and operable to pass the lock pin when the wiper system is in the run mode but to hold the lock pin when in the park mode so as to retain the base plate in the predetermined position.

7. A wiper system according to claim 5 wherein the means for transforming comprises a drive link attached on one end of the driver arm and on the other end to a wiper shaft for rotation therearound, the wiper shaft having the at least one wiper mounted thereto for oscillatory motion therearound.

* * * * *